United States Patent Office 3,696,037
Patented Oct. 3, 1972

3,696,037
ANHYDROUS ELECTROLYTE FOR ELECTROLYTIC CAPACITORS
Bengt Åke Lagercrantz, Stocksund, and Kåre Andersen, Stockholm, Sweden, assignors to Telefonaktiebolaget LM Ericsson, Stockholm, Sweden
No Drawing. Filed June 10, 1970, Ser. No. 45,209
Claims priority, application Sweden, June 19, 1969, 8,797/69
Int. Cl. H01g 9/02
U.S. Cl. 252—62.2
2 Claims

ABSTRACT OF THE DISCLOSURE

Electrolyte for electrolytic capacitor, consisting of a solution of phthalic acid in an amide, the phthalic acid being at least partly neutralized with an amine.

The present invention relates to an anhydrous electrolyte for electrolytic capacitors containing aluminum electrode.

It is known, for electrolytic capacitors to use an electrolyte consisting of a boric acid salt dissolved in a solution of glycol and water. A disadvantage of this electrolyte is that it attacks the oxide layer of the electrode which layer constitutes the dielectric of the condenser. The water in the electrolyte gradually hydrates the oxide layer, so that the dielectric layer is gradually reduced during formation of a new non-insulating layer. The effect on the oxide layer results in a gradual increase in the capacitance of the capacitor as well as in the losses and the leakage of the current until the condenser stops to function. The process is accelerated by time and is generally more noticeable in capacitors which are made for lower rated voltage than in the capcitors for higher rated voltage.

The speed with which the oxide layer is attacked can of course be reduced by reducing the percentage of water in the electrolyte. Then, however, the specific resistance of the electrolyte increases, i.e. the series resistance of the capacitor, and is a factor in the loss of efficiency of the condenser.

The part of the loss factor which depends on the resistance of the electrolyte is in general inversely proportional to the rated voltage of the capacitors. In capacitors for low voltages, i.e., below about 10 volts, the specific resistance has to be kept relatively low, at 25° C. below about 500 ohm cm. A capacitor for 10 volts having the conventional boric acid electrolyte can function barely 1000 hours at a temperature of 70° C. with this resistance, which in many cases is not satisfactory.

The use of the conventional boric acid electrolyte is also inconvenient since the impregnation of the capacitor paper with this electrolyte is difficult to make as the paper expands owing to the presence of water of the electrolyte.

In order to avoid these inconveniences, efforts have been made to achieve anhydrous electrolytes. As, however, most of the salts are difficult to dissolve or are scarcely dissociatable in fluids other than water, the problem is to produce an electrolyte with sufficiently low resistance. The ingredients included in the electrolyte, furthermore, must have sufficient thermal stability and must of course not affect the oxide layer.

The electrolyte according to the invention fulfills these requirements and, furthermore requires a relatively low cost to produce.

The invention is characterized in that that the electrolyte consists of a solution of completely or partly neutralized phthalic acid in an amide.

In the following three examples are given of the composition of the electrolyte.

EXAMPLE 1

N-methylformamide _____ millilitre__ 19.0
Phthalic acid _____ gram__ 1.17
Triethylamine _____ millilitre__ 1.0

This electrolyte has a specific resistance of 131 ohm cm. at 25° C.

EXAMPLE 2

N,N-dimethylformamide _____ millilitre__ 30
Phthalic acid _____ gram__ 1.9
Morpholine _____ millilitre__ 1.0

This electrolyte has a specific resistance at 25° C. of 174 ohm cm.

EXAMPLE 3

N,N-dimethylacetamide _____ millilitre__ 32
Phthalic acid _____ gram__ 5.8
Triethylamine _____ millilitre__ 5.0

This electrolyte has a specific resistance at 25° C. of 135 ohm cm.

In all these examples the electrolyte has, as is seen low resistivity, shows good chemical stability, and has very small effect on the aluminium oxide. Under a long-range test, which was carried with capacitors for 64 volts provided with the electrolyte of Example 3, the above mentioned values were obtained of the capacitance C, loss factor tg $\delta$ and leakage current I.

|  | C, MF | tg $\delta$ | I, $\mu$A. |
|---|---|---|---|
| 0 hour | 24.7 | 4.6 | 1.5 |
| 1,000 hours | 25.0 | 5.3 | 0.4 |

The test was conducted at a voltage equal to the rated voltage and at a temperature of 100° C. The leakage current I was measured 1 minute after switching on the voltage, and immediately after the condenser was cooled down at the end of 1,000 hours.

The presence of water is sometimes difficult to avoid under usual manufacturing conditions. A percentage of water below about 5% has substantially no effect on the conductivity. Any effect which the presence of water may have on the oxide can, as is known, be reduced by adding phosphate ions.

While the small percentage of water and phosphate will not improve the electrolyte, they will not cause any substantial deterioration of the electrolyte.

We claim:

1. An electrolyte for electrolytic capacitors consisting essentially of a solution of phthalic acid at least partially neutralized by an amine in an amide selected from the group consisting of N-methylformamide, N,N-dimethylformamide and N,N-dimethylacetamide.

2. An electrolyte according to claim 1 wherein the amine is triethylamine.

(References on following page)

References Cited

UNITED STATES PATENTS

| | | | |
|---|---|---|---|
| 3,490,740 | 1/1970 | Sternbeck | 252—62.2 |
| 3,454,840 | 7/1969 | Hagihara et al. | 252—62.2 X |
| 3,502,947 | 3/1970 | Hand | 252—62.2 X |
| 3,138,746 | 6/1964 | Burger et al. | 252—62.2 X |
| 2,945,164 | 7/1960 | Taylor | 252—62.2 X |

FOREIGN PATENTS 172,951　10/1960　Sweden　252—62.2

TOBIAS E. LEVOW, Primary Examiner

J. COOPER, Assistant Examiner

U.S. Cl. X.R.

317—230